Patented May 2, 1933

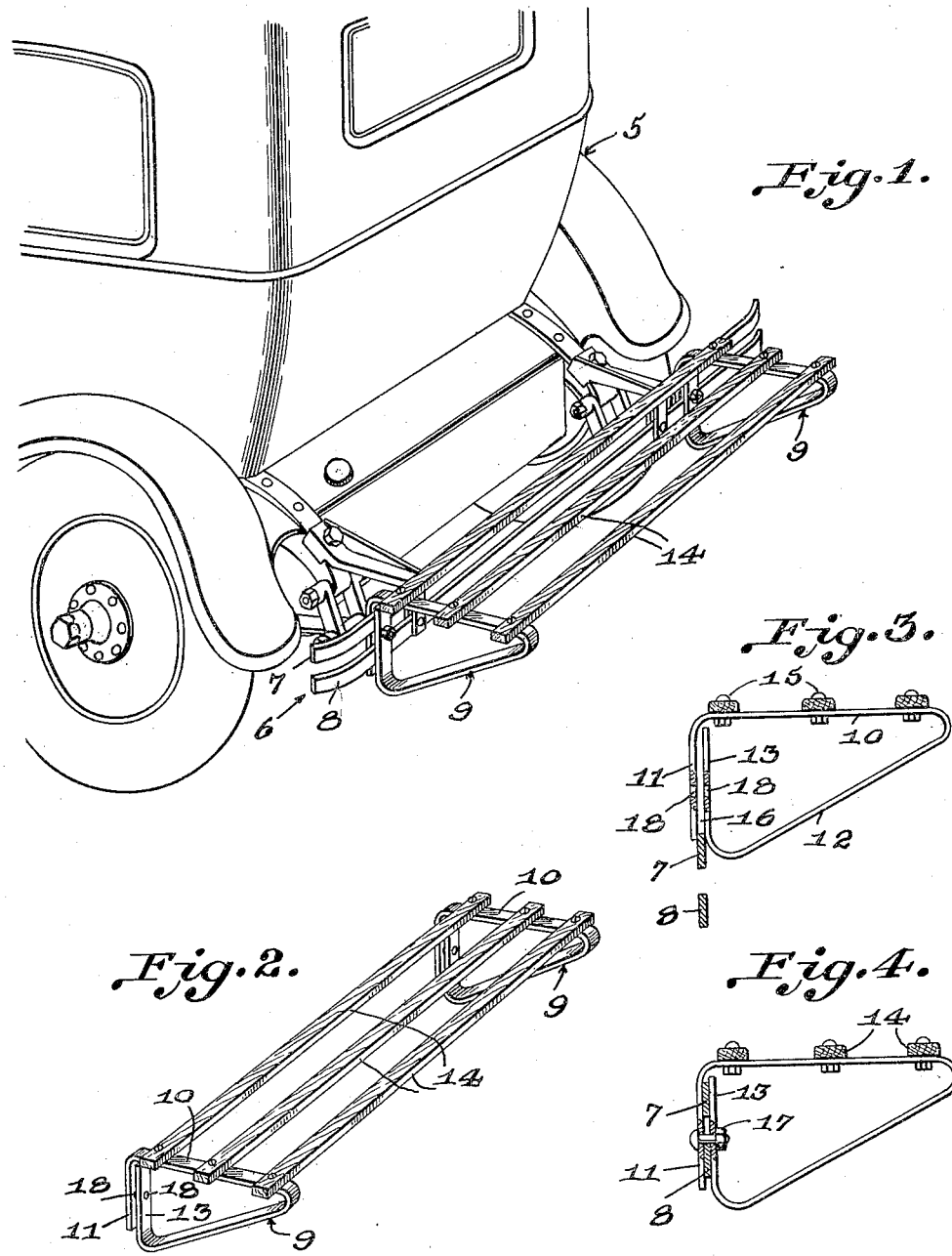

1,906,920

UNITED STATES PATENT OFFICE

ELMER L. SHEFFER, OF DUBOISTOWN, PENNSYLVANIA

LUGGAGE CARRIER

Application filed February 5, 1931. Serial No. 513,738.

This invention relates to improvements in luggage carriers for motor vehicles, and more particularly to a luggage support which may be attached to either the front or rear bumper of an automobile.

The primary object of the invention is to provide a luggage carrier of simple and inexpensive construction, and one which can be attached to or detached from a bumper almost instantaneously, and one which, when detached, can be readily stored under an automobile seat cushion when the carrier is not in use.

A further object is to furnish a luggage carrier made up of a comparatively few elements which are detachably secured to one another to facilitate compact storage of the same, and which comprises bracket elements, each bracket element having an upwardly extending arm to bear upon one side of the bumper, and a downwardly extending arm to bear upon the opposite side of the bumper; these arms being clamped to the bumper by means of a suitable bolt.

With the foregoing objects outlined and with other objects in view which will appear as the description proceeds, the invention consists in the novel features hereinafter described in detail, illustrated in the accompanying drawing, and more particularly pointed out in the appended claim.

In the drawing,

Fig. 1 is a perspective view of the rear portion of an automobile with my improved luggage carrier attached to the rear bumper thereof.

Fig. 2 is a perspective view of the luggage carrier.

Fig. 3 is an end view of the carrier partly in vertical section, and illustrating the manner in which it is slipped on to the bumper bars.

Fig. 4 is a similar view after the carrier has been bolted to the bars.

Referring to the drawing, 5 designates an automobile having a conventional rear bumper 6 comprising upper and lower spaced bars 7 and 8.

My improved luggage carrier is designed to be rapidly attached to or detached from such a bumper, and the carrier preferably comprises a pair of brackets 9, each of substantially triangular form and consisting of a metal strap bent to form a horizontal part 10 terminating at one end in a downwardly extending arm 11. The opposite end of the part 10 is united with an inclined part 12 which terminates in an upwardly extending arm 13.

Horizontal rods 14 extend between the brackets and are detachably connected to the horizontal parts 10 by any suitable fastening devices such as bolts 15. This allows the bars to be removed from the brackets when the carrier is to be stored flat under an automobile seat.

It will be noted that the arms 11, 13 of each bracket are spaced apart to form a guideway 16 to receive the bars of the bumper when the luggage carrier is being attached to the bumper, and after the luggage carrier has been moved downwardly a desired degree relatively to the bumper bars, bolts 17 are introduced through apertures 18 in the arms, and pass through the space between the bumper bars for rigidly securing the carrier to the bumper.

Of course, when the bolts 17 are removed, the carrier may be instantaneously detached from the bumper.

It will be observed that each bolt 17 forces the arm 13 to bear upon one side of the bumper, and the arm 11 to bear upon the opposite side of the bumper, so that pressure on opposite sides of the bumper will be equalized and the nut of the bolt will tend to remain screwed up tight until it is desired to remove the same.

From the foregoing it is believed that the construction, and advantages of the invention may be readily understood, and it is apparent that changes may be made in the details disclosed, without departing from the spirit of the invention, as expressed in the claim.

What is claimed and desired to be secured by Letters Patent is:

A luggage carrier to be attached to an automobile bumper, comprising a plurality of brackets, each bracket being of substantially triangular shape and formed of a single piece of strap metal and including a horizontal portion having at one end an integral depending vertical arm, the other end of the horizontal portion being provided with an integral downwardly inclined part which terminates in an upwardly extending vertical arm positioned adjacent and arranged parallel to said depending arm, said arms being spaced apart and provided with aligned apertures, luggage supporting bars secured to the horizontal portions of said brackets, and bolts passing through said apertures for securing the arms to an automobile bumper.

In testimony whereof, I have signed this specification.

ELMER L. SHEFFER.